(12) United States Patent
Suzuki et al.

(10) Patent No.: US 8,494,176 B2
(45) Date of Patent: Jul. 23, 2013

(54) INFORMATION PROVIDING SYSTEM

(75) Inventors: Hiroshi Suzuki, Tokyo (JP); Ichiro Okuyama, Tokyo (JP); Takashige Tsukuma, Tokyo (JP); Yoshimaru Maruno, Tokyo (JP)

(73) Assignee: Field System, Inc., Tokyo (JP)

( * ) Notice: Subject to any disclaimer, the term of this patent is extended or adjusted under 35 U.S.C. 154(b) by 752 days.

(21) Appl. No.: 11/994,277

(22) PCT Filed: Aug. 9, 2005

(86) PCT No.: PCT/JP2005/014561
§ 371 (c)(1),
(2), (4) Date: Dec. 28, 2007

(87) PCT Pub. No.: WO2007/000829
PCT Pub. Date: Jan. 4, 2007

(65) Prior Publication Data
US 2009/0233582 A1    Sep. 17, 2009

(30) Foreign Application Priority Data

Jun. 28, 2005   (JP) .................................. 2005-187934

(51) Int. Cl.
*H04B 3/00*       (2006.01)

(52) U.S. Cl.
USPC ........................... 381/77; 381/150; 455/550.1

(58) Field of Classification Search
USPC ....... 455/414.1, 507, 550.1; 341/50; 704/252, 704/242, 253, 201; 348/E5.125, E7.024; 371/172, 132, 135; 381/150, 152, 55, 58, 381/77
See application file for complete search history.

(56) References Cited

U.S. PATENT DOCUMENTS

| | | | | |
|---|---|---|---|---|
| 4,783,809 A | * | 11/1988 | Glinski | 704/244 |
| 5,768,399 A | * | 6/1998 | Statham et al. | 381/120 |
| 5,884,259 A | * | 3/1999 | Bahl et al. | 704/252 |
| 6,567,397 B1 | * | 5/2003 | Campana, Jr. et al. | 370/349 |
| 6,768,803 B1 | * | 7/2004 | Duhamel | 381/372 |
| 2003/0125957 A1 | * | 7/2003 | Puterbaugh et al. | 704/275 |
| 2003/0212549 A1 | * | 11/2003 | Steentra et al. | 704/201 |
| 2004/0073429 A1 | | 4/2004 | Naruse | |
| 2005/0219068 A1 | * | 10/2005 | Jones et al. | 341/50 |
| 2005/0226274 A1 | * | 10/2005 | Kwon et al. | 370/474 |

FOREIGN PATENT DOCUMENTS

| | | |
|---|---|---|
| EP | 1 906 696 A1 | 4/2008 |
| JP | 2002-341865 A | 11/2002 |

(Continued)

OTHER PUBLICATIONS

RS232, downloaded on Dec. 2, 2010 from www.machine-information-systems.com/RS232.html, pp. 1-2, filed herewith as Exhibit A.

(Continued)

*Primary Examiner* — Edward Urban
*Assistant Examiner* — Golam Sorowar
(74) *Attorney, Agent, or Firm* — JTT Patent Services, LLC; Gerald T. Peters (57) ABSTRACT

A novel information providing system for providing various information to a terminal is proposed. The information providing system 1 according to an embodiment of the present invention includes a transmitter 10 for transmitting various information as information on sound pressure vibration, a portable telephone 20 serving as a terminal for receiving various information, and a server 50 connected through the Internet 40 to the transmitter 10. The configuration is characterized in that various information is transmitted as sound through the air serving as a medium from the transmitter 10 to the portable telephone 20.

12 Claims, 5 Drawing Sheets

FOREIGN PATENT DOCUMENTS

| | | |
|---|---|---|
| JP | 2003-186500 A | 7/2003 |
| JP | 2004-179956 A | 6/2004 |
| JP | 2005-122641 A | 5/2005 |
| WO | 0245286 A2 | 6/2002 |
| WO | 2005055566 A1 | 6/2005 |

OTHER PUBLICATIONS

"Recommended Standard-232 (RS-232)," downloaded from www.businessdictionary.com on Dec. 2, 2010, 1 page.

"Recommended Standard 232 (RS232)—Glossary Entry," downloaded from www.mobile-phone-directory.org on Dec. 2, 2010, 1 page.

"What is RS-232", downloaded from www.wisegeek.com/what-is-rs-232.htm on Dec. 2, 2010, pp. 1-3.

International Search Report issued in the corresponding application PCT/JP2005/014561, completed on Nov. 10, 2005 and mailed on Nov. 22, 2005.

Internatiional Search Report, issued in corresponding application No. EP 1 906 696 A1, completed Nov. 10, 2005, mailed Nov. 22, 2005.

* cited by examiner

| | | | preamble | | SOF | type | length |
|---|---|---|---|---|---|---|---|
| 1 | data1 | data2 | data3 | data4 | data5 | data6 | data7 | CRC |
| 2 | data8 | data9 | data10 | data11 | data12 | data13 | data14 | CRC |
| 3 | data15 | data16 | data17 | data18 | data19 | data20 | data21 | CRC |
| 4 | data22 | data23 | data24 | data25 | data26 | data27 | data28 | CRC |
| 5 | data29 | data30 | data31 | data32 | data33 | data34 | data35 | CRC |
| 6 | data36 | data37 | data38 | data39 | data40 | data41 | data42 | CRC |
| 7 | data43 | data44 | data45 | data46 | data47 | data48 | data49 | CRC |
| 8 | data50 | data51 | data52 | data53 | data54 | data55 | data56 | CRC |
| 9 | data57 | data58 | data59 | data60 | data61 | data62 | data63 | CRC |
| 10 | data64 | data65 | data66 | data67 | data68 | data69 | data70 | CRC |
| 11 | data71 | data72 | data73 | data74 | data75 | data76 | data77 | CRC |
| 12 | data78 | data79 | data80 | data81 | data82 | data83 | data84 | CRC |
| 13 | data85 | data86 | data87 | data88 | data89 | data90 | data91 | CRC |
| 14 | data92 | data93 | data94 | data95 | data96 | data97 | data98 | CRC |
| 15 | data99 | data100 | data101 | data102 | data103 | data104 | data105 | CRC |
| 16 | data106 | data107 | data108 | data109 | data110 | data111 | data112 | CRC |

16 row total bit number
1024 total time
42.66ms

INFORMATION PROVIDING SYSTEM

This is a National Phase Application in the United States of International Patent Application No. PCT/JP2005/014561 filed Aug. 9, 2005, which claims priority on Japanese Patent Application No. 2005-187934, filed Jun. 28, 2005. The entire disclosures of the above patent applications are hereby incorporated by reference.

TECHNICAL FIELD

The present invention relates to an information providing system for providing various information to a terminal.

BACKGROUND ART

A system for providing various information to a terminal is conventionally proposed.

In radio and television broadcasting, a teletext broadcasting for superimposing (multiplexing) character code and graphic information, information related to the program etc. on a broadcast signal, and providing various information to a television receiver and radio receiver by being added to the usual program content is carried out.

Various information are provided to portable radio and television by superimposing digitized information on vacant frequency in the assigned channel in radio broadcast, on high range of a sub-carrier used in stereo broadcast, and on a blank scanning line remaining between a vertical synchronization and an effective image range in television broadcast.

A system of providing information to a portable telephone by reading a two-dimensional code such as QR code (registered trademark) printed or displayed on a display using a portable telephone with a camera function, and deciphering the code is already put to practical use.

The two-dimensional code includes information such as URL and product description in a coded form, where the user of the portable telephone can display various information on the display of the portable telephone by reading the two-dimensional code. With the portable telephone having Internet access function, the home page may be accessed by reading the URL, and various information can be downloaded and displayed.

The information providing system using the two-dimensional code is disclosed in patent document 1 and the like.

Patent document 1: Japanese Laid-Open Patent Publication No. 2005-122641

DISCLOSURE OF THE INVENTION

Problems to be Solved by the Invention

However, in the teletext broadcasting system, an installation of a large broadcast station is essential since the digital information must be superimposed on the television or the radio airwave. Therefore, the cost increases, and information cannot be readily provided to the terminal.

A method of photographing the QR code using the camera of the portable telephone cannot be used in the terminal that does not have a camera. Furthermore, the user must move the imaging unit of the portable telephone to a position at where the QR code can be recognized while holding the portable telephone with hand, and thus is troublesome. In order to correctly image and recognize the QR code, the QR code must be positioned at a predetermined size at the center of the photographed image in a focused state, which is a very difficult task for beginners and those not familiar with the equipment.

The present invention solves the above problems and aims to provide a novel information providing system.

Means for Solving the Problems

In order to solve the above problems, an information providing system according to the present invention includes a transmitter for converting various coded information to a sound pressure vibration and transmitting the sound pressure vibration; and a terminal for restoring the various information by receiving and decoding the sound pressure information; wherein information is transmitted as sound through air serving as a medium from the transmitter to the terminal.

Furthermore, the information providing system according to the present invention further includes a broadcast facility for broadcasting television, radio, and the like, the broadcast facility including a computing means for coding and superimposing the various information on a broadcast signal, and a transmission antenna for transmitting the broadcast signal as airwave; wherein the transmitter includes a transmission antenna for receiving the broadcast signal, and a speaker for transmitting the various coded information superimposed on the broadcast signal as the sound pressure vibration by reproducing the broadcast signal.

A transmitter according to the present invention is a transmitter for transmitting various information to a terminal in an information providing system, the transmitter including a computing means for coding the various information; and a speaker for converting the various coded information to a sound pressure vibration and transmitting the sound pressure vibration, information being transmitted to the terminal as sound through air serving as a medium.

A terminal according to the present invention is a terminal for receiving various information transmitted as a sound pressure vibration from a transmitter in an information providing system; the terminal including a microphone for receiving and converting the sound pressure vibration to an electrical signal; and a computing means for restoring the various information by decoding the electrical signal.

An information providing method according to the present invention is an information providing method for providing various information to a terminal; the method including coding step of coding the various information; transmitting step of converting the various coded information to a sound pressure vibration and transmitting the sound pressure vibration; receiving step of receiving the sound pressure vibration in the terminal; and restoring step of restoring the various information by decoding the sound pressure vibration in the terminal.

A program according to the present invention is a program executed by a computing means of a terminal for receiving various information transmitted as a sound pressure vibration from a transmitter in an information providing system; the program causing the computing means of the terminal to execute step of causing a microphone of the terminal to receive and convert the sound pressure vibration to an electrical signal; and step of restoring the various information by decoding the electrical signal.

A broadcast facility according to the present invention is a broadcast facility for broadcasting television, radio, and the like, the broadcast facility including a computing means for coding and superimposing various information on a broadcast signal; and a transmission antenna for transmitting the broadcast signal as airwave; wherein the broadcast signal superimposed with the various coded information is configured so that the various coded information superimposed on the broadcast signal is transmitted as a sound pressure vibration from a speaker of the broadcast receiver when the broadcast signal is received and reproduced by a broadcast receiver.

Effect of the Invention

According to the present invention, a novel information providing system, information providing method, as well as a transmitter, a terminal, a broadcast facility and a program used in the information providing system operated at low cost using the conventional facility are provided.

DESCRIPTION OF SYMBOLS 1, 2 information providing system
10 transmitter
11 display
12 keyboard
13 speaker
14 PC body
20 portable telephone
21 microphone
22 display
40 Internet
50 server
60 broadcast station
61 transmission antenna
70 broadcast receiver
71 antenna
72 speaker
101 A/D conversion circuit
102 frame dividing circuit
103 peak/average detector
104 rise detector
105 masking detector
106 code generating circuit
107 D/A conversion circuit
108 low pass filter
109 adder circuit
201 band pass filter
202 AGC circuit
203 detector
204 PLL circuit
205 descramble circuit
206 CRC circuit

BEST MODE FOR CARRYING OUT THE INVENTION

The embodiment of the present invention will now be described with reference to the drawings. The information providing system according to the embodiment of the present invention has features in that various information such as message are transmitted as sound (sound pressure vibration) from a speaker towards a terminal on the information transmitter side, and the sound pressure vibration is received from a microphone and decoded to recognize the transmitted information on the terminal side. That is, the information providing system is characterized in that information is transmitted through the air serving as a medium from the transmitter to the terminal.

(First Embodiment)

Figure 1:
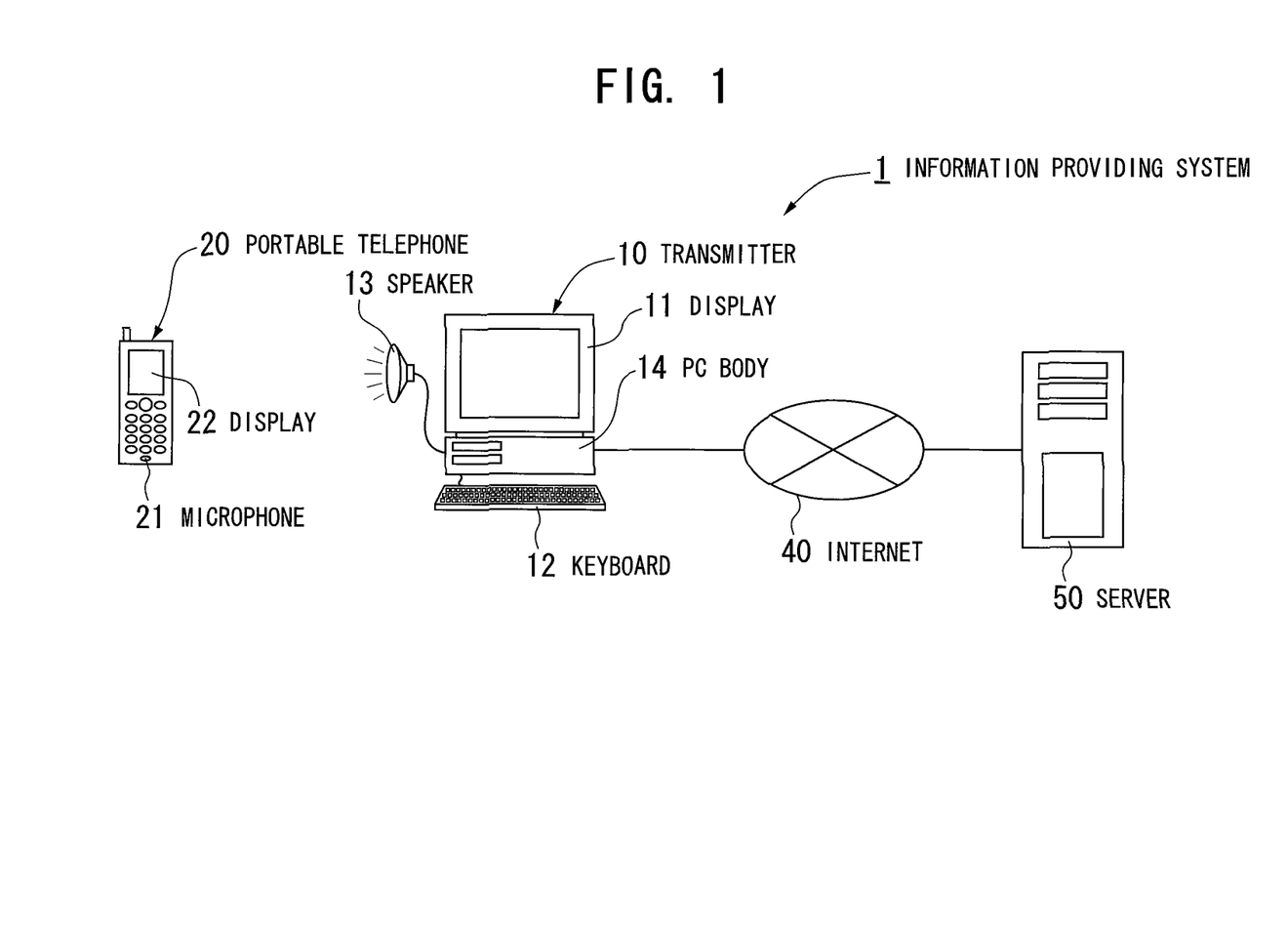
FIG. 1 is a view schematically showing a configuration of an information providing system according to a first embodiment.

FIG. 1 is a view schematically showing a configuration of an information providing system 1 according to the present embodiment. As shown in FIG. 1, the information providing system 1 is configured by a transmitter 10 for transmitting various information as information on sound pressure vibration, a portable telephone 20 serving as a terminal for receiving the various information, and a server 50 connected through the Internet 40 to the transmitter 10. The transmitter 10 is configured by a keyboard 11 serving as an input means, a display 12, a speaker (PA) 13 for transmitting various information as sound, and a PC (Personal Computer) body 14 connected thereto. PA is an abbreviation for Public Address, and is a collective term for an electrical acoustic loudspeaker.

Although not shown, an MPU (microprocessor) serving as a computing means for performing various calculations and control, a memory used as a work area in calculation, and a storage device (hard disc) for storing various data, program, and the like are built in the PC body 14.

The portable telephone 20 includes a microphone 21 for picking up sound from the speaker 13, and a display 22. Although not shown, a processor serving as a computing means for performing various calculations and control, and a memory are built in the portable telephone 20.

The transmitter 10 of the information providing system 1 is installed in commercial establishments such as department stores, supermarkets, shopping areas, movie theaters, amusement parks, amusement establishments, and the like. The various information (sound pressure vibration information) converted to sound pressure vibration is transmitted from the speaker 13 alone or superimposed on other voices such as music being played or announcement being made in the establishments. Customers visiting the establishment obtain various information by receiving the sound pressure vibration information using his/her portable telephone 20.

Messages related to products, events, announcement of establishments, and character information such as URL of the related HP are provided to the owner of the terminal as various information. The customers visiting the establishment reads the URL and accesses the Internet using the Internet function of the terminal to acquire more information or directly read the product description.

Obviously, the location of installing the transmitter can be freely decided by the information provider, and may be appropriately installed in other locations. The content of the information to be provided is also not limited to character information, and may be image information etc.

Figure 2:
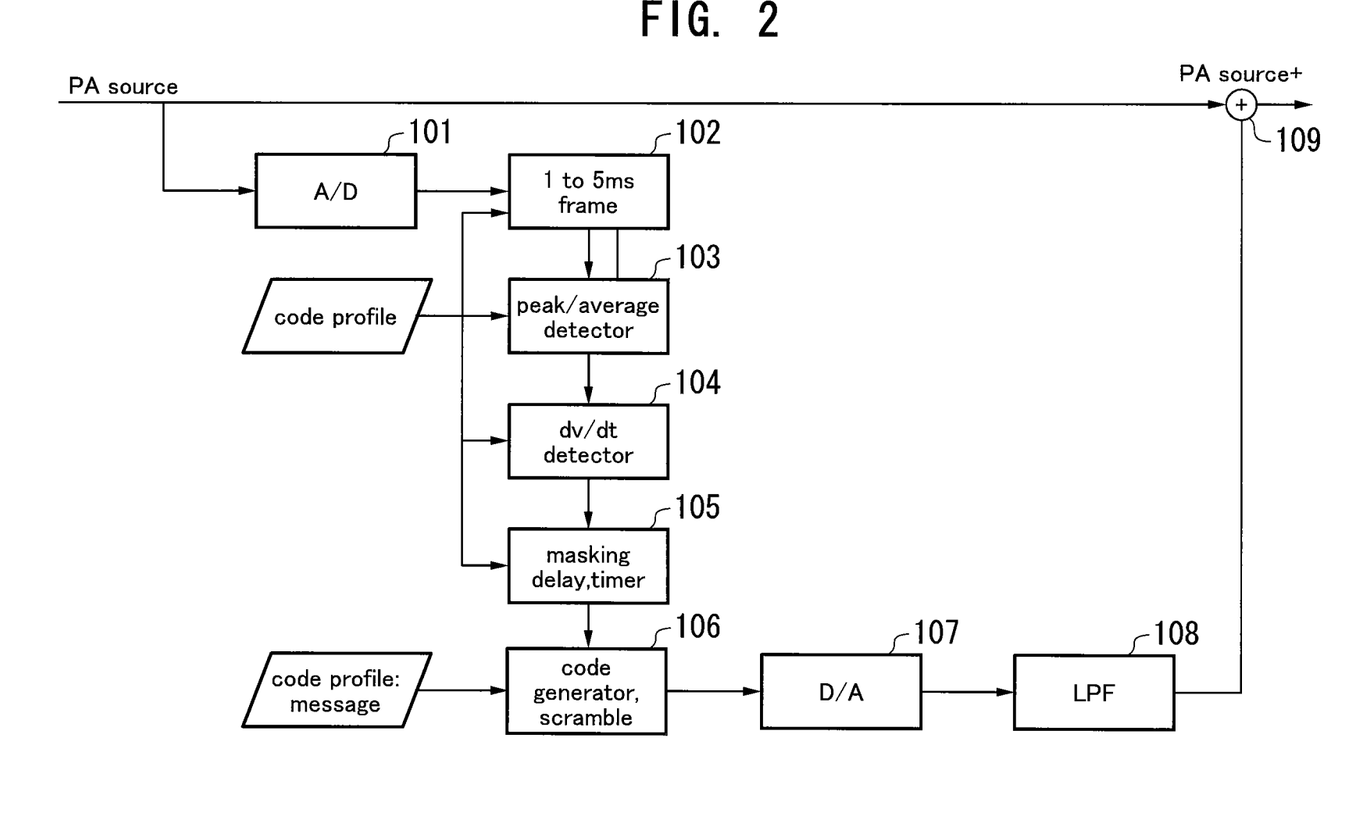
FIG. 2 is a block diagram showing a conceptual circuit for realizing a function for generating a sound code.

A process of generating sound pressure vibration information (hereinafter referred to as "sound code") to be transmitted towards the portable telephone 20 in the transmitter 10 will now be described in detail. FIG. 2 is a block diagram showing a conceptual circuit for realizing a function of generating the sound code.

PA source shown in FIG. 2 refers to the sound playing from the PA, that is, the voice on which the sound code is superimposed in establishments etc. installed with the transmitter 10. If the music CD is playing from the PA, the voice signal of the music is the PA source signal, where the PA source signal is zero if the music is not playing.

The PA source signal is used to determine the timing of generating the sound code, the sound pressure level, and the like. The PA source signal is first converted to a digital signal by an A/D converter circuit 101, transmitted through a frame dividing circuit 102, a peak/average detector 103, a rise detector 104, and a masking circuit 105, and parameters for generating the sound code are determined. Each circuit sets an appropriate parameter while referencing the code profile.

The code profile is a profile created by having the information provider access the server 50 through the transmitter 10 in advance, register various information (message) to transmit, and set the signal level and the timing required by the information provider. The information provider can easily create the code profile by accessing the server 50, and making inputs according to the required items displayed on the display 11. The created code profile is transmitted from the server 50 to the PC body 14 and stored therein, and is referenced when creating the sound code, as described above.

In the frame dividing circuit 102, the PA source signal is divided into frame units for every 1 to 5 ms, and the subsequent processes are performed in frame units. The processing unit is appropriately set with an optimum value with reference to the characteristics of the PA source and the code profile.

In the peak/average detector 103, the peak value and the average value of the PA source signal are detected, which become reference parameters for setting a sound pressure level when transmitting the sound code.

In the rise detector 104, the rising edge of the PA source signal is detected. The location where the PA source signal rises is at where the sound rapidly becomes large, and the value detected thereat is used to obtain a masking effect to be hereinafter described.

In the masking circuit 105, the parameter for transmitting the sound code at the timing when the masking effect is significantly exhibited is set with reference to the rising edge of the PA source signal. The masking effect is one psychological acoustic evaluation in which small sound (signal of low sound pressure) is drown out by large sound (signal of high sound pressure). In the present embodiment, the sound code is transmitted at around 12 kHz, and thus setting is made such that the sound code is transmitted at the timing when the masking effect is significantly exhibited in such band, as hereinafter described.

Subsequently, in the code generating circuit 106, various information (message) contained in the code profile is coded based on the parameters obtained as above, and the sound code is generated. Furthermore, in the code generating circuit 106, a scramble process is performed in code generation. The scramble process is a process of preventing a signal of either 0 or 1 from being continuously generated, where pseudo random signal is used herein. As hereinafter described, since NRZ modulation is used in the present system, the apparent frequency lowers by the continued number when the signal of either 0 or 1 continues. In order to avoid this, the scramble process is performed, and the occurrence of frequency of 0, 1 is brought as close as possible to one on one.

A frequency band of the sound code to be generated is determined based on the following points. First, the frequency band must be the frequency within the operable range of the microphone 21 mounted on the portable telephone 20 serving as a receiver and the speaker 13 of the transmitter 10. According to the review of the present inventors, the receivable frequency band of the microphone mounted on a certain portable telephone is between 50 Hz and 20 kHz, and the reproducible band of some speakers used in the PA system is between 65 Hz to 20 kHz or 65 Hz and 17 kHz.

The influence of the sound of the sound code on the original PA source sound must be made small. The audible sound range of humans varies among individuals but is said to be normally between 15 and 20 kHz. The frequency range of a fundamental wave from musical instruments is said to be between 30 Hz and 4100 Hz for piano, 10 Hz and 8000 Hz for pipe organ, and 200 Hz and 2650 Hz for violin, and the voice from human is said to be between 85 Hz and 1100 Hz.

In the present embodiment, the NRZ signal is used as a transmission signal of the sound code, and greater amount of data can be handled the higher the clock frequency, as hereinafter described. Therefore, the band of high as possible frequency is desirably used to handle greater amount of data.

In view of the above, the frequency for transmitting the sound code is desirably around 12 to 13 kHz, which is a high sound band in the audible sound range. The sound code may be transmitted using frequency of other bands in accordance with the demand of the information provider. The frequency for transmitting the sound code must meet the transmittable band of the speaker and the receivable band of the microphone, and thus the transmission frequency may be changed in accordance with the performance of the speaker and the microphone. In particular, when the performance of the speaker to be used is low and the frequency responding range is narrow, the frequency band that can be transmitted from the speaker obviously must be selected.

Figure 3:
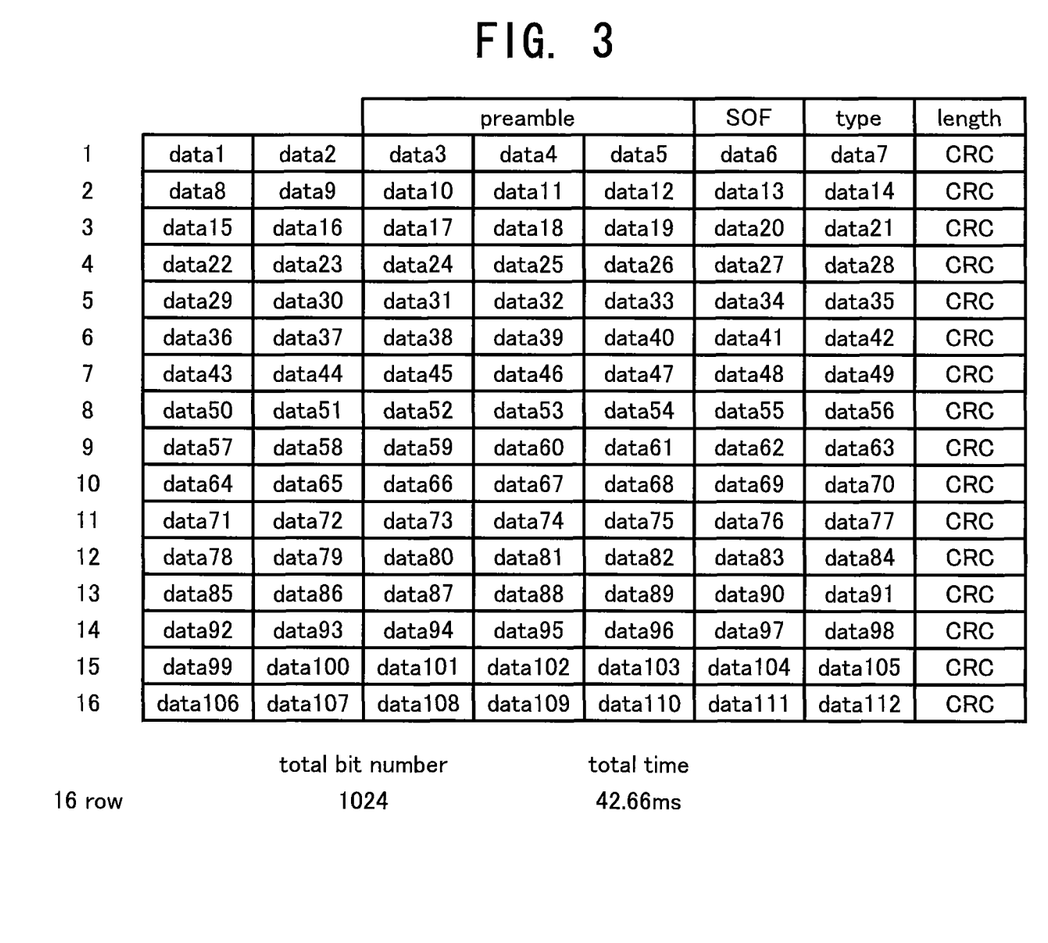
FIG. 3 is a view showing a data structure of the sound code.

The data structure of the sound code will now be described with reference to FIG. 3. FIG. 3 is a view showing the data structure of the sound code. The data frame shown in FIG. 3 includes the SOF (Start Of File) for identifying the head of the file, the type (type) of the data, and the (length) representing the length of the data in order after the preamble for synchronizing the timing. Sixteen data rows each configured by data1, data2, . . . , data7, CRC (Cyclic Redundancy Code) are thereafter arranged, and data of 112 bytes can be handled with such one frame.

The type is used to identify the information provider, to limit the receiver to a specific party, and the like. The length represents the length of the sound code, and is configured to handle the frame shown in FIG. 3 up to a maximum of 16 frames, that is, data of 2048 bytes.

The CRC is added for error correction. The CRC refers to polynomial redundancy code for error detection and error correction of the data, where the error signal code (CRC) is added to the transmitting data beforehand so that error correction can be performed in time of reception. The process is not performed for every frame herein but the CRC is added and error correction is performed for every seven bytes, and the amount of data can be appropriately varied in units of rows.

The sound code generated in this manner is sent according to the timing determined in the masking circuit 105. The transmission time of one frame is set to 42.66 ms, and is 682.66 ms even for the maximum 16 frames.

Subsequently, the sound code is NRZ (Non Return to Zero) modulated and converted to an analog signal in a D/A converter circuit 107. The sound pressure level of the sound code is determined by assigning bits following the detection result in the peak/average detector. The bit size is set within an arbitrary range, but is suitably between 10 and 16 bits. In the case of 16 bits, the smallest sound pressure level of 0,1 becomes 0000,0×0001, and the largest sound pressure level becomes 0000,0×FFFF.

The sound code converted to the analog signal becomes a sine wave with the high frequency component cut by a low pass filter (LPF) 108.

The analog signal of the sound code shaped in this manner is added with the PA source signal in an adder circuit 109, and transmitted from the speaker. In FIG. 2, "PA source+" means that the sound code is superimposed on the PA source signal.

The process of generating the sound code described above is realized as software by having the computing means of the transmitter 10 execute an application stored in the storage device, but may be realized as hardware by arranging a dedicated circuit for performing such process.

Figure 4:
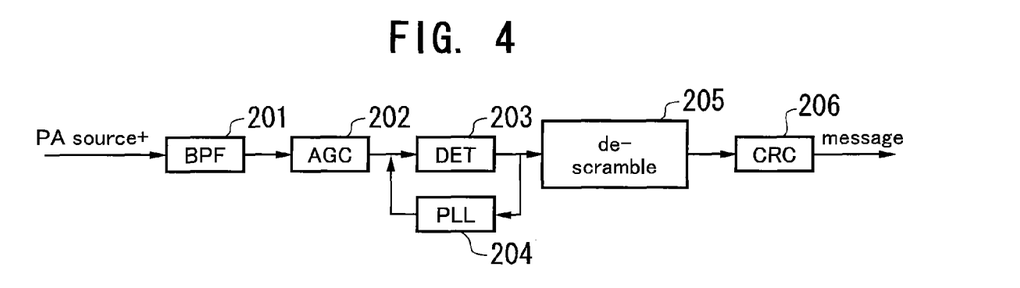
FIG. 4 is a block diagram showing a conceptual circuit for realizing a function for receiving the sound code.

The process of receiving the sound code at the portable telephone 10 on the terminal side will now be described with reference to FIG. 4. FIG. 4 is a block diagram showing a conceptual circuit for realizing the function of receiving the sound code.

The sound of the PA source superimposed with the sound code is picked up by the microphone 21 of the portable telephone 10, and converted to an electrical signal indicated as PA source+ in FIG. 4. The electrical signal first passes through a band pass filter (BPF) 201. The BPF 201 is configured to cut the frequency other than the vicinity of the transmission frequency of the sound code, and only the signal of the sound code component of the PA source+is mainly sent to an AGC (Automatic Gain control) circuit 202.

The AGC circuit 202 is a circuit for automatically adjusting an amplification factor (gain) of the amplifier circuit so that a constant output is obtained even when the amplitude of the input electrical signal fluctuates, and the signal level of the received sound code is adjusted therein.

The signal is synchronized by a DET (detector) 203 and a PLL (Phase Locked Loop) circuit 204, and the original NRZ signal is obtained. When the precision of the reception clock is sufficiently high, the PLL circuit 204 may be omitted.

The sound code signal is then sent to a descramble circuit 205 at where the scramble process performed on the sound code is canceled, and the sound code is decoded.

The sound code signal is then sent to a CRC (Cyclic Redundancy Check) circuit 206 at where error is detected based on the CRC added to the sound code in advance, and error correction is performed. The CRC is added for every row of the frame structure shown in FIG. 3, and the error correction in the CRC circuit 206 is also performed for every row.

The message is restored from the sound code decoded in this manner, and displayed on the display 22 of the portable telephone 20. A method of presenting the restored message to the owner of the terminal is not limited to a method of visually displaying the restored message on the display, and may be presented through voice from the speaker (not shown) of the portable telephone 20.

The control and process for receiving the sound code and restoring the message are realized as software by having the computing means of the portable telephone 20 execute a predetermined program, but may be realized as hardware by installing a circuit for realizing a specific function.

The configuration of the information providing system 1 according to the first embodiment has been described above, and now, a procedure for transmitting various information (message) using the present system will be described.

First, the information transmitter who desires to transmit various information using the present information providing system creates the code profile. The code profile is created by accessing the server 50 through the transmitter 10. The code profile is registered with the message to be transmitted, as well as the set values desired by the information transmitter regarding the timing of transmission, the sound pressure level of the sound code to be transmitted, the transmission frequency, and the like.

For the timing of transmission, a timing of transmitting successively for ten times every minute (if the sound code is configured by 16 frames, the transmission time per one time is 682.66 ms), a timing of transmitting repeatedly in an endless manner every ten seconds, or the like is set.

When the information transmitter gives a transmission command of the sound code to the transmitter 10, the sound code is generated according to the processes described above, and the sound code is transmitted from the speaker 13 of the transmitter 10. In this case, the voice signal of the sound code is transmitted while being superimposed on the PA source sound if the PA source signal exists, and only the voice signal of the sound code is transmitted according to the profile data if the PA source signal does not exist.

The sound code according to the present embodiment is transmitted using the frequency near the high sound band of 12 kHz of the audible sound band, the transmission time being in units of milliseconds, and thus it is a sound barely audible by human ears unless listened carefully even if the PA source signal does not exist. If the PA source signal exists, the masking effect is applied, and the sound of the sound code is barely felt by human ears.

The owner of the portable telephone who desires to receive the sound code executes the application of JAVA (registered trademark) or BREW (registered trademark) for receiving the sound code on the portable telephone 20 to pick up the sound code from the microphone 21 and display the transmitted various information (message) on the display 22. If the reception sensibility of the sound code is low, the sound code can be reliably received by changing the orientation of the portable telephone 20 to direct the microphone 21 towards the speaker 13 or by bringing the portable telephone 20 closer to the speaker 13.

Regarding the transmission of various information using the sound code, notification may be made to customers visiting the establishment through the bulletin board in the establishment or through voice announcement.

If the message of the sound code is URL, the customer receiving the same accesses the homepage using the Internet connection function of the portable telephone to obtain further information.

Therefore, according to the information providing system of the present embodiment described in detail above, various information can be provided to customers visiting the establishment at low cost using the existing facilities, and the like. A microphone for conversation is built in the existing portable telephone for the information receiving terminal, whereby various information by sound code can be received by simply incorporating application for the information providing system therein.

In the present embodiment, a case where only one speaker 13 of the transmitter 10 is arranged has been described by way of example for the sake of simplifying the description, but a plurality of speakers may be arranged when the sound code is desirably received at a plurality of locations in the establishment.

Furthermore, in the present embodiment, the sound code is generated by the transmitter installed at the location desired for transmission, but the sound code may be created in advance by accessing the server etc. so that the transmitter arranged at the site merely transmits (reproduces) the sound code created in advance at a predetermined timing.

(Second Embodiment)

The second embodiment according to the present invention will now be described. The second embodiment differs greatly from the first embodiment, which proposes the information providing system having a configuration of transmitting the sound code from the speaker connected to the PC, in that the sound code (sound pressure vibration information) is broadcasted by being superimposed on public broadcast of television, radio broadcast, and the like, and the sound code is transmitted from the speaker of the receiver receiving the airwave as sound pressure vibration. The description on the configuration common with the first embodiment will be omitted, and the configuration that is different will be described in detail below.

Figure 5:
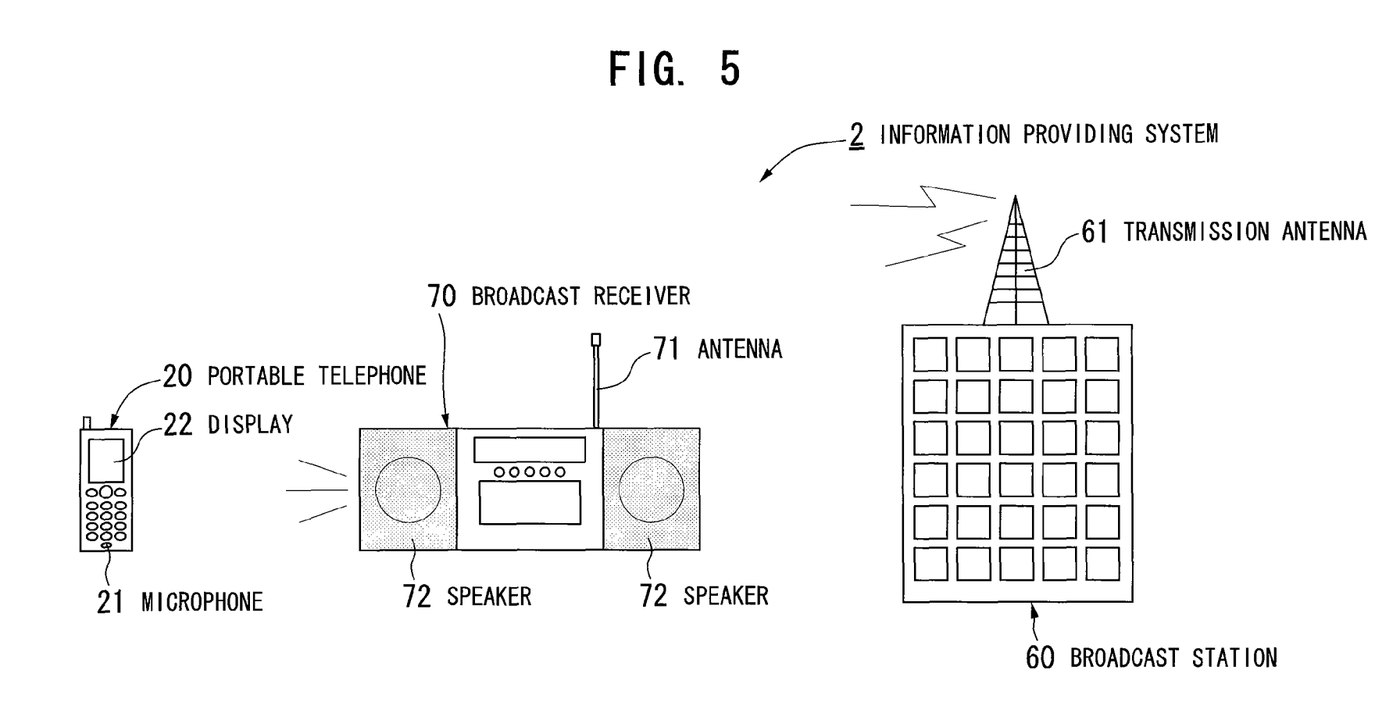
FIG. 5 is a view schematically showing a configuration of an information providing system 2 according to a second embodiment.

FIG. 5 is a view schematically showing the configuration of an information providing system 2 according to the second embodiment. The radio broadcasting will be described by way of example. As shown in FIG. 5, the information providing system 2 includes a broadcast station 60 which broadcasts radio programs, a broadcast receiver 70 for receiving and reproducing airwave, and transmitting the sound code superimposed on the airwave as sound pressure vibration, and the portable telephone 20 for receiving the sound pressure vibration.

The broadcast station 60 includes equipment (not shown) for transmitting the airwave and a transmission antenna 61, and also includes a system for generating the code profile (not shown) and a system for generating the sound code and superimposing the same on the airwave of the program information for broadcasting. The broadcast receiver 70 includes an antenna 71 for receiving the airwave and a speaker 72 for reproducing the voice information (and sound code) of the broadcast program.

In the information providing system 2 having such configuration, the program information superimposed with the sound code is first broadcasted from the broadcast station 60. The code profile is created in advance in accordance with the demands of the information provider (advertising provider etc.) desiring transmission of the sound code. The sound code generated based on the predetermined timing of transmission, sound pressure level, frequency, and the like while referencing the code profile is superimposed on the program information signal (PA source signal), and broadcasted to wide areas from the transmission antenna 61.

The broadcast receiver 70 receiving the airwave superimposed with the sound code from the antenna 71 reproduces the voice information of the program from the speaker 72 and also reproduces the voice information of the sound code from the speaker 72, that is, transmits as sound pressure vibration.

In the broadcast program, an announcement to the effect that message such as URL is superimposed and broadcasted as sound code is made. The owner of the portable telephone 20 who desires to receive the message activates the application for receiving the sound code, and then directs the microphone 21 of the portable telephone 20 towards the speaker 72, so that the sound code may be retrieved to the portable telephone 20 via the microphone 21. The retrieved sound code is decoded in the portable telephone 20, and the message of the sound code is displayed on the display 22.

The second embodiment has been described in detail above, where according to the present embodiment, the sound code can be broadcasted to wide areas using public broadcasting, and the sound pressure vibration of the sound code can be transmitted at numerous locations through the receiver receiving the broadcast. Furthermore, a simple system for superimposing the sound code merely needs to be added to the existing broadcast facility, and the sound code can be transmitted to wide areas with small facility investment.

The present embodiment can be effectively used to deliver character information etc. that cannot be fully delivered in the program to the viewers. Furthermore, if the URL information is sent as sound code to facilitate the access of the viewer to the homepage of the program or the homepage of the sponsor, it can be effectively used as advertising medium.

In the present embodiment, the information providing system 2 has been described for a case applied to terrestrial radio by way of example, but may be applied to terrestrial television, or may be applied to cable broadcast such as cable television, satellite broadcast such as CS broadcast and BS broadcast, and the like in addition to terrestrial broadcast.

The information providing system according to the present invention has been described based on the first and second embodiments, where various information can be provided to the terminal through a novel method not proposed in a related art according to the present information providing system. Furthermore, according to the present system, information can be provided by effectively using the existing facility, and the information providing system can be built at low cost.

The embodiment of the present invention is not limited to the first and second embodiments, and various modifications may be made without departing from the concept of the present invention.

For instance, the format structure of the sound code can be appropriately changed, and the error correcting method or the coding method may obviously be freely set as appropriate.

The terminal on the receiver side is not limited to a portable telephone, and may be any terminal as long it is a terminal equipped with a microphone. For instance, PDA, IC recorder, portable radio, portable television, notebook computer, radio cassette player, game machine and the like may be the terminal. A dedicated terminal for applying the present invention may be provided.

The terminal on the receiver side may be a terminal without a display as long as a speaker is arranged, so that various information can be notified to the owner of the terminal by reproducing the same by voice. The terminal is not limited to a portable terminal, and may be a stationary terminal, or a terminal equipped with a microphone for picking up the sound of the sound code.

The code profile is not limited to being created by accessing the server, and may be created using the PC body with an application for creating the code profile installed in the PC body of the user. Instead of creating the code profile in advance, each parameter may be set when generating the sound code.

Moreover, the transmission frequency of the sound code is not limited to around 12 kHz, and preferable frequency band can be appropriately used. For instance, if the performance of the speaker is low (when sound of higher than or equal to 10 kHz cannot be transmitted), the frequency of a slightly lower frequency band of 7 to 8 kHz is used. A plurality of frequency bands may be used, and the transmission frequency of the sound code may be appropriately changed in accordance with the frequency characteristic of the PA source signal.

DRAWINGS

FIG. 1
1 PORTABLE TELEPHONE
2 DISPLAY
3 MICROPHONE
4 SPEAKER
5 TRANSMITTER
6 DISPLAY
7 PC BODY
8 KEYBOARD
9 INFORMATION PROVIDING SYSTEM
10 INTERNET
11 SERVER

FIG. 5
1 PORTABLE TELEPHONE
2 DISPLAY
3 MICROPHONE
4 BROADCAST RECEIVER
5 ANTENNA
6 SPEAKER
7 SPEAKER
8 INFORMATION PROVIDING SYSTEM
9 TRANSMISSION ANTENNA
10 BROADCAST STATION

The invention claimed is:

1. An information providing system comprising:
   (a) a transmitter that converts coded information to a sound pressure vibration and that transmits the sound pressure vibration in one-way fashion, wherein the transmitter comprises
      i. a sound code generator for generating a sound code, the sound code comprising at least one data frame in units of milliseconds, the at least one data frame including at least one preamble for synchronizing timing;
      ii. an analog signal creator for creating an analog signal based on the sound code; and
      iii. a transducer that transduces the analog signal to create the sound pressure vibration for transmission in air; and
   (b) a terminal that restores the coded information by receiving the sound code and decoding the at least one data frame;
   wherein the sound code is transmitted cyclically in repetitive fashion as sound through air serving as a medium from the transmitter to the terminal.

2. The information providing system according to claim 1, wherein the at least one data frame further includes a Start of File for identifying a head of the frame, a type of the data, and a length representing length of the data.

3. The information providing system according to claim 1, wherein
   the transmitter includes a computing means for coding the information, and a speaker for transmitting the coded information as the sound pressure vibration; and
   the terminal includes a microphone for receiving and converting the sound pressure vibration to an electrical signal, and a computing means for restoring the information by decoding the electrical signal.

4. The information providing system according to claim 3, wherein a transmission frequency of the sound pressure vibration is a predetermined frequency contained in a reproducible band of the speaker and a receivable band of the microphone.

5. The information providing system according to claim 4, wherein the transmission frequency of the sound pressure vibration is a frequency contained in a high sound band of an audible sound band.

6. The information providing system according to claim 1, further comprising:
   a broadcast facility for broadcasting, the broadcast facility including a computing means for coding and superimposing the information on a broadcast signal, and a transmission antenna for transmitting the broadcast signal as an airwave; wherein
   the transmitter includes a transmission antenna for receiving the broadcast signal, and a speaker for transmitting the coded information superimposed on the broadcast signal as the sound pressure vibration by reproducing the broadcast signal.

7. A transmitter for transmitting coded information in one-way fashion to a terminal in an information providing system, the transmitter comprising:
   (a) a sound code generator for generating a sound code, the sound code comprising at least one data frame in units of milliseconds, the at least one data frame including at least one preamble for synchronizing timing;
   (b) an analog signal creator for creating an analog signal based on the sound code; and
   (c) a transducer that transduces the analog signal to create a sound pressure vibration for transmission in air;
   wherein the transducer is a speaker that transmits the sound code to the terminal cyclically in repetitive fashion as sound through air serving as a medium.

8. The transmitter according to claim 7, wherein the at least one data frame further includes a Start of File for identifying a head of the frame, a type of the data, and a length representing length of the data.

9. An information providing method for providing coded information to a terminal, wherein the method comprises the steps of:
   (a) generating a sound code, the sound code comprising at least one data frame in units of milliseconds, the at least one data frame including at least one preamble for synchronizing timing;
   (b) creating an analog signal based on the sound code;
   (c) transducing the analog signal to create a sound pressure vibration that causes the sound code to be transmitted cyclically in repetitive fashion as sound through air serving as a medium to a terminal;
   (d) receiving the sound pressure vibration at the terminal; and
   (e) restoring the coded information by decoding the sound pressure vibration at the terminal.

10. The information providing method according to claim 9, wherein the at least one data frame further includes a Start of File for identifying a head of the frame, a type of the data, and a length representing length of the data.

11. A broadcast facility for broadcasting television, radio, and other broadcast signals, the broadcast facility comprising:
   (a) a computing means for coding and superimposing information on a broadcast signal, wherein the computing means comprises
      a sound code generator for generating a sound code, the sound code comprising at least one data frame in units of milliseconds, the at least one data frame including at least one preamble for synchronizing timing; and
   (b) a transmission antenna arranged to transmit the broadcast signal as an airwave;
   wherein the broadcast signal on which the coded information is superimposed is configured so as to permit an analog signal to be created based on the sound code, and the analog signal to be transduced to create a sound pressure vibration that causes the sound code to be transmitted in one-way fashion cyclically in repetitive fashion from a speaker of a broadcast receiver, when the broadcast signal is received and reproduced by the broadcast receiver.

12. The broadcast facility according to claim 11, wherein the at least one data frame further includes a Start of File for identifying a head of the frame, a type of the data, and a length representing length of the data.

* * * * *

UNITED STATES PATENT AND TRADEMARK OFFICE
CERTIFICATE OF CORRECTION

| | |
|---|---|
| PATENT NO. | : 8,494,176 B2 |
| APPLICATION NO. | : 11/994277 |
| DATED | : July 23, 2013 |
| INVENTOR(S) | : Suzuki et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this
Twenty-fourth Day of February, 2015

Michelle K. Lee
*Deputy Director of the United States Patent and Trademark Office*